Jan. 13, 1931. R. E. GARRETT 1,788,389
BOX TOE STIFFENER
Filed Jan. 3, 1925

Patented Jan. 13, 1931

1,788,389

UNITED STATES PATENT OFFICE

RAYMOND E. GARRETT, OF LANCASTER, PENNSYLVANIA, ASSIGNOR TO ARMSTRONG CORK COMPANY, OF PITTSBURGH, PENNSYLVANIA, A CORPORATION OF PENNSYLVANIA

BOX-TOE STIFFENER

Application filed January 3, 1925. Serial No. 352.

The present invention relates to box toe stiffeners for shoes. These stiffeners are used for reinforcing the tips of shoes and are usually placed between the shoe upper and its lining. They usually consist of a fabric backing having calendered thereon a composition consisting of granulated cork, mineral fillers, vegetable oils, gums and resins.

I have found that a superior box toe stiffener can be formed by using a composition comprising granulated cork and a binder consisting of rubber or rubber substitutes, together with one or more mineral fillers, and a curing agent, such as sulphur.

Figure 1:
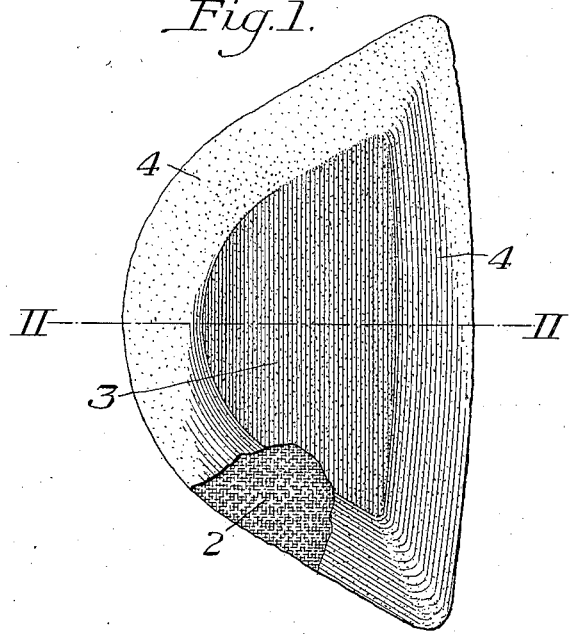
Figure 2:
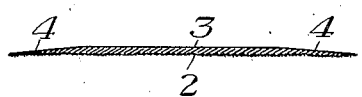

In the accompanying drawings:

Figure 1 is a plan view, partly broken away, of a box toe stiffener, embodying my invention, and Figure 2 is a section on the line II—II of Figure 1.

In carrying out my invention I first make a cork-rubber mixture, preferably in accordance with the following formula:

| | Per cent |
|---|---|
| Pale crepe rubber | 8 |
| Reclaimed rubber | 31 |
| Dissolved bone glue | 16 |
| Granulated cork | 31 |
| Litharge | 1 |
| Sulphur | 1 |
| Zinc oxide | 12 |
| | 100 |

The resulting plastic material is calendered on a cotton fabric, either twill, drill, sheeting or duck construction and the sheet material resulting is then subjected to vulcanization, either by direct heat applied on hydraulic presses, dry heat by hanging in hot closets, or acid curing, which consists in passing the material through an acid solution and then subjecting it to heat in a hot oven. The material is then died out of the piece in shapes required for different patterns and styles of shoes and the edges of the died out shapes skived or buffed. A completed stiffener is illustrated in the drawings, in which the reference numeral 2 designates the fabric backing, and 3 the cork-rubber composition having the skived edges 4.

While I prefer to use the above materials in about the proportions specified, other mineral fillers can be substituted for the litharge and zinc oxide and in about the same proportions. For example, whiting can be used in place of the litharge and china clay or aluminum flake in place of the zinc oxide, also the amount of reclaimed rubber can be reduced by, say, 10% and either resin, asphalt, hydro-carbon, corn or pine tar oil substituted. Of these rubber substitutes I prefer to use asphalt and of the oil substitutes pine tar.

If desired the vulcanizing agent can be omitted from the composition, in which case the product is unvulcanized, but I prefer the vulcanized form of stiffener as it has more toughness and strength.

Box toe stiffeners made in accordance with my invention are superior to the usual stiffeners made from a composition consisting of granulated cork, mineral fillers, oils, gums and resins in that the cork and rubber composition is much tougher and will stand a great deal more strain in pulling over in the lasting operation without cracking or breaking. Furthermore, the rubber adds a little more resiliency or spring to the toe, which causes it to come back to shape quicker than the other material.

A further advantage of the material is that it is capable of absorbing moisture and on this account is comfortable to wear; whereas mixtures which are principally rubber or rubber composition are very hot and uncomfortable, probably due to the fact that they do not have the moisture absorbing quality which is characteritsic of my material.

I claim:

1. A box toe stiffener for shoes, comprising a fabric backing having applied thereto a composition comprising granulated cork and rubber, substantially as described.

2. A box toe stiffener for shoes, comprising a fabric backing having applied thereto a composition comprising granulated cork, rubber and a vulcanizing agent, substantially as described.

3. A box toe stiffener for shoes, comprising a fabric backing having applied thereto a composition comprising granulated cork, rubber and a mineral filler, substantially as described.

4. A box toe stiffener for shoes, comprising a fabric backing having applied thereto a composition comprising granulated cork, rubber, a mineral filler and a vulcanizing agent, substantially as described.

5. A box toe stiffener for shoes, comprising a fabric backing having applied thereto a composition comprising granulated cork, rubber, glue and a mineral filler, substantially as described.

6. A box toe stiffener for shoes, comprising a fabric backing having applied thereto a composition comprising granulated cork, rubber, asphalt and a mineral filler, substantially as described.

7. A box toe stiffener for shoes, comprising a fabric backing having applied thereto a composition comprising at least 25% granulated cork, at least 30% rubber, a mineral filler and a vulcanizing agent, substantially as described.

8. A box toe stiffener for shoes, comprising a fabric backing having applied thereto a composition comprising granulated cork approximately 30%, rubber approximately 40%, a mineral filler and a vulcanizing agent, substantially as described.

9. A box toe stiffener for shoes, comprising a normally substantially flat stiffener formed of a fabric backing having applied thereto a composition comprising granulated cork and rubber, the composition having sufficient flexibility to permit of a pulling-over operation in applying the box toe to shoes, substantially as described.

10. A box toe stiffener for shoes, comprising a fabric backing having applied thereto a composition comprising granulated cork and rubber, the granulated cork being in sufficient quantity to leave the composition capable of absorbing moisture, substantially as described.

11. A box toe comprising a fabric backing having applied thereto a mixture of cork and rubber cured while in engagement with the backing so as to insure adherence of the mixture to the backing without the use of a cement.

12. A box toe stiffener for shoes, comprising a fabric backing having applied thereto a composition comprising granulated cork and a rubber-containing binder, the amount of cork being between 25 and 50% of the mix, such toe stiffener being characterized by sufficient flexibility to permit of the pulling-over operation in applying the box toe to a shoe, in its capability of absorbing moisture, and in its resiliency or spring-back if indented.

13. A box toe stiffener for shoes, comprising a fabric backing having applied thereto a composition comprising granulated cork and rubber so proportioned as to produce a flexible, resilient box toe which may be readily lasted into the shoe and which will readily spring back to shape if indented in the wearing of the shoe.

14. A box toe stiffener for shoes, having curved and tapered edges, and comprising a fabric backing having applied thereto a composition comprising granulated cork and a rubber-containing binder, the amount of cork being between 25 and 50% of the mix, such toe stiffener being characterized by sufficient flexibility to permit of the pulling-over operation in applying the box toe to a shoe, in its capability of absorbing moisture, and in its resiliency or spring-back if indented.

15. A box toe stiffener for shoes having curved and tapered edges, and comprising a fabric backing having applied thereto a composition comprising granulated cork and rubber so proportioned as to produce a flexible, resilient box toe which may be readily lasted into the shoe and which will readily spring back to shape if indented in the wearing of the shoe.

In testimony whereof I have hereunto set my hand.

R. E. GARRETT.